(12) United States Patent
Koyama et al.

(10) Patent No.: US 10,883,533 B2
(45) Date of Patent: Jan. 5, 2021

(54) METHOD OF MANUFACTURING SPLINE TELESCOPIC SHAFT

(71) Applicant: JTEKT CORPORATION, Osaka (JP)

(72) Inventors: Takeshi Koyama, Neyagawa (JP); Kazushi Takahashi, Yao (JP)

(73) Assignee: JTEKT CORPORATION, Osaka (JP)

( * ) Notice: Subject to any disclaimer, the term of this patent is extended or adjusted under 35 U.S.C. 154(b) by 79 days.

(21) Appl. No.: 15/605,033

(22) Filed: May 25, 2017

(65) Prior Publication Data

US 2017/0350440 A1 Dec. 7, 2017

(30) Foreign Application Priority Data

Jun. 6, 2016 (JP) ................. 2016-112791

(51) Int. Cl.

| | | |
|---|---|---|
| *F16C 3/03* | (2006.01) | |
| *B62D 1/16* | (2006.01) | |
| *B05D 1/32* | (2006.01) | |
| *F16D 3/06* | (2006.01) | |
| (Continued) | | |

(52) U.S. Cl.
CPC .............. *F16C 3/03* (2013.01); *B05D 1/32* (2013.01); *B62D 1/16* (2013.01); *F16D 3/06* (2013.01); *B62D 1/185* (2013.01); *B62D 1/20* (2013.01); *F16D 2250/0046* (2013.01); *F16D 2300/10* (2013.01)

(58) Field of Classification Search
CPC ... B21H 5/04; B21H 5/00; B21H 5/02; B21H 5/022; B21H 5/025; B21H 5/027; B21H 5/045; F16C 2226/80
See application file for complete search history.

(56) References Cited

U.S. PATENT DOCUMENTS

| | | | | |
|---|---|---|---|---|
| 2010/0196106 A1* | 8/2010 | Allen | ................... | B23D 43/02 407/14 |
| 2011/0030496 A1* | 2/2011 | Tokioka | ................. | F16C 3/035 74/492 |
| 2016/0325795 A1* | 11/2016 | Matsumoto | ............ | B62D 1/185 |

FOREIGN PATENT DOCUMENTS

| | | |
|---|---|---|
| JP | 2005-066598 A | 3/2005 |
| JP | 2009-114527 A | 5/2009 |
| WO | 2015/137036 A1 | 9/2015 |

OTHER PUBLICATIONS

Nov. 6, 2017 Search Report issued in European Patent Application No. 17174203.4.

* cited by examiner

*Primary Examiner* — James M Mellott
(74) *Attorney, Agent, or Firm* — Oliff PLC

(57) ABSTRACT

A method of manufacturing a spline telescopic shaft includes a masking step in which, in a prescribed axial-direction region of an intermediate manufacturing product, partial tooth grooves that are equally spaced circumferentially are respectively covered by masking members that are equally spaced circumferentially; a resin coating step in which a resin layer is formed, and inner surfaces of the partial tooth grooves covered by the masking members are left as metal exposed portions that are equally spaced circumferentially; and a coating film forming step in which, in a state where the intermediate manufacturing product provided with the resin layer is centered with respect to a broach via the metal exposed portions, the intermediate manufacturing product and the broach are caused to slide relative to each other in an axial direction by press-fitting such that the resin layer is shaved to form a resin coating film.

6 Claims, 13 Drawing Sheets

(51) Int. Cl.
*B62D 1/185* (2006.01)
*B62D 1/20* (2006.01)

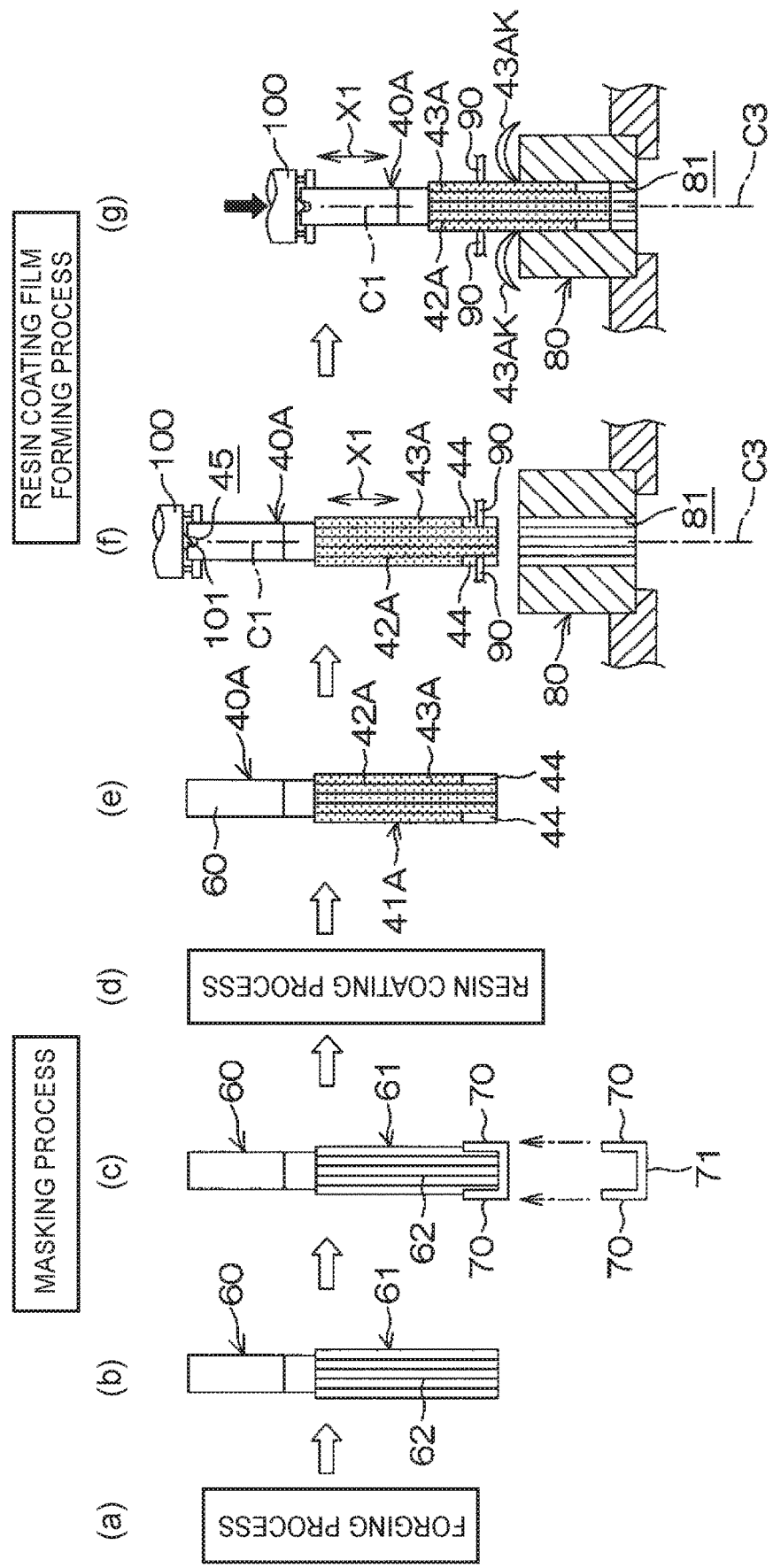

METHOD OF MANUFACTURING SPLINE TELESCOPIC SHAFT

INCORPORATION BY REFERENCE

The disclosure of Japanese Patent Application No. 2016-112791 filed on Jun. 6, 2016 including the specification, drawings and abstract is incorporated herein by reference in its entirety.

BACKGROUND

1. Technical Field

The disclosure relates to a method of manufacturing a spline telescopic shaft.

2. Description of Related Art

For example, an intermediate shaft of a steering system is required to have a function to absorb displacement in an axial direction so as to prevent transmission of vibration from a road surface to a steering wheel. Further, a steering shaft having one end to which the steering wheel is connected is required to have a function to expand and contract in an axial direction for a position adjustment. Accordingly, spline telescopic shafts are used as the intermediate shaft and the steering shaft.

In this kind of spline telescopic shaft, it is necessary to allow an inner shaft and an outer shaft to slide smoothly relative to each other and to prevent the occurrence of backlash. Therefore, a resin coating film is formed on a tooth face of at least one of an outer tooth portion of the inner shaft and an inner tooth portion of the outer shaft. Generally, for example, a resin layer is formed by a fluidized immersion method or the like on a surface of a metal core shaft having an outer tooth portion and then the intermediate manufacturing product provided with the resin layer is inserted into a die to shave the excess resin, thereby forming a resin coating film.

If centering between the intermediate manufacturing product and the die is insufficient when the intermediate manufacturing product is inserted into the die, the thickness of the resin coating film becomes uneven, and varies depending on its circumferential position. In this case, the thinner portion of the resin coating film is worn away earlier in long-term use, and thus, the metal base surface is exposed. Therefore, the spline telescopic shaft cannot slide smoothly. Consequently, a steering feeling is degraded. If the intermediate manufacturing product includes a metal exposed portion located in a range greater than or equal to its prescribed axial length, it is possible to achieve accurate centering between the intermediate manufacturing product and the die using the metal exposed portion.

For example, in PCT International Publication No. WO 2015/137036, a spline shaft portion of an inner shaft includes a first shaft portion covered with a synthetic resin film, and a second shaft portion that is a metal shaft portion disposed on the distal end side relative to the first shaft portion. If the second shaft portion that is the metal shaft portion in PCT International Publication No. WO 2015/137036 is used for centering, it is possible to improve the centering accuracy.

SUMMARY

However, the second shaft portion that is the metal shaft portion has a diameter smaller than that of the first shaft portion covered with the synthetic resin film and thus does not mesh with an inner tooth portion of an outer shaft. That is, since the axial length of the second shaft portion is not included in the meshing length between the inner shaft and the outer shaft, the meshing length becomes shorter (smaller), which is disadvantageous in terms of wear resistance. Further, in a spline telescopic shaft whose overall length is limited, the telescopic stroke is limited.

The disclosure provides a spline telescopic shaft that can achieve smooth sliding over a long period of time while ensuring the telescopic stroke.

An aspect of the disclosure relates to a method of manufacturing a spline telescopic shaft. The method includes a masking step in which, in a prescribed axial-direction region of an intermediate manufacturing product formed by either one of a metal core including a metal outer tooth portion that is annularly disposed and a metal tube including a metal inner tooth portion that is annularly disposed, partial tooth grooves disposed to be equally spaced circumferentially are respectively covered by a plurality of masking members disposed to be equally spaced circumferentially; a resin coating step in which a resin layer is formed by supplying a synthetic resin to a surface of the metal outer tooth portion or the metal inner tooth portion, and inner surfaces of the partial tooth grooves covered by the plurality of masking members are left as a plurality of metal exposed portions disposed to be equally spaced circumferentially; and a coating film forming step in which, in a state where the intermediate manufacturing product provided with the resin layer is centered with respect to a broach via the plurality of metal exposed portions, the intermediate manufacturing product and the broach are caused to slide relative to each other in an axial direction by press-fitting such that the resin layer is shaved to form a resin coating film.

According to the manufacturing method described above, in the coating film forming step, the intermediate manufacturing product can be accurately centered with respect to the broach using the circumferentially equally spaced metal exposed portions formed in the resin coating step. Therefore, a uniform resin coating film can be formed in the coating film forming step. Accordingly, in the spline telescopic shaft, smooth sliding can be ensured over a long period of time. Further, since the resin coating film disposed at the same axial-direction position as the axial-direction position where the metal exposed portions are disposed can also be used as a sliding region, the area of the meshing tooth portions increases, and thus, wear resistance of the resin coating film is improved and further the sufficient telescopic stroke can be ensured.

In the masking step, a connecting member connecting ends of the plurality of masking members to each other may be brought into contact with an end face of the intermediate manufacturing product in the axial direction.

According to the manufacturing method described above, the plurality of masking members can be collectively attached to the intermediate manufacturing product. Thus, the plurality of masking members can be attached to the intermediate manufacturing product with high working efficiency. Further, since the connecting member is brought into contact with the end face of the intermediate manufacturing product in the axial direction, the masking members can be accurately positioned in the axial direction of the intermediate manufacturing product. Therefore, the axial-direction positions of the metal exposed portions can be set accurately.

In the masking step, each of the masking members may be elastically pressed against a corresponding one of the partial tooth grooves by a spring property of the connecting member while being supported in a cantilever manner by the connecting member.

According to the manufacturing method described above, the masking members can be held at the partial tooth grooves using the spring property of the connecting member.

In the masking step, each of the masking members may be held at a corresponding one of the partial tooth grooves by magnetic attractive force.

According to the manufacturing method described above, the masking members can be easily detachably attached to, and held at the partial tooth grooves.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 5 including (a) to (g) is a schematic diagram showing processes of manufacturing the inner shaft in the first embodiment;

DETAILED DESCRIPTION OF EMBODIMENTS

Figure 1:
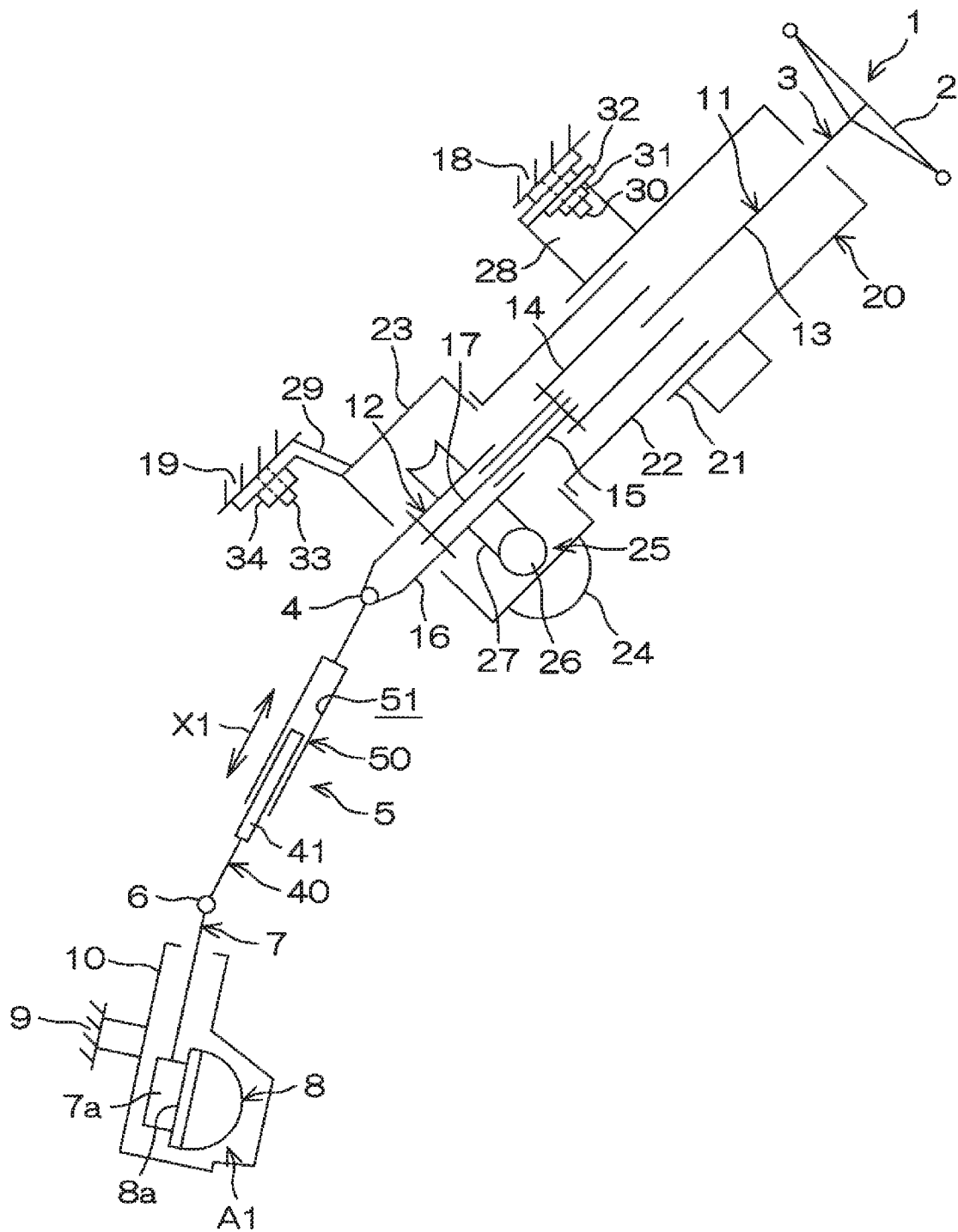
FIG. 1 is a diagram showing a schematic configuration of a steering system including an intermediate shaft to which a spline telescopic shaft manufactured by a manufacturing method of a first embodiment of the disclosure is applied.

Embodiments of the disclosure will be described with reference to the accompanying drawings. FIG. 1 is a schematic diagram of a steering system 1 including an intermediate shaft 5 to which a spline telescopic shaft manufactured by a manufacturing method of a first embodiment of the disclosure is applied.

As shown in FIG. 1, the steering system 1 includes a steering shaft 3 having one end connected to a steering wheel 2, and a steering column 20 disposed around the steering shaft 3. The steering system 1 further includes an intermediate shaft 5 as a spline telescopic shaft connected to the steering shaft 3 via a universal joint 4, a pinion shaft 7 connected to the intermediate shaft 5 via a universal joint 6, and a rack shaft 8 as a steered shaft including a rack 8a meshing with a pinion 7a of the pinion shaft 7.

A rack-and-pinion mechanism including the pinion shaft 7 and the rack shaft 8 constitutes a steering gear mechanism A1. The rack shaft 8 is supported by a housing 10 fixed to a vehicle-body-side member 9 so as to be movable in an axial direction (a direction perpendicular to the sheet surface) along a right-left direction of a vehicle. Although not shown, end portions of the rack shaft 8 are each connected to a corresponding steered wheel via a corresponding tie rod and a corresponding knuckle arm.

The steering shaft 3 includes a first steering shaft 11 and a second steering shaft 12 that are coaxially connected to each other. The first steering shaft 11 includes an upper shaft 13 and a lower shaft 14 that are fitted, using spline coupling, to each other in a torque transmittable manner so as to be slidable relative to each other in an axial direction. One of the upper shaft 13 and the lower shaft 14 constitutes an inner shaft and the other shaft constitutes a tubular outer shaft.

The second steering shaft 12 includes an input shaft 15 connected to the lower shaft 14 so as to be rotatable together with the lower shaft 14, an output shaft 16 connected to the intermediate shaft 5 via the universal joint 4, and a torsion bar 17 connecting the input shaft 15 and the output shaft 16 to each other such that the input shaft 15 and the output shaft 16 are rotatable relative to each other. The steering column 20 is fixed to vehicle-body-side members 18 and 19. The steering shaft 3 is rotatably supported by the steering column 20 via bearings (not shown).

The steering column 20 includes a tubular upper jacket 21 and a tubular lower jacket 22 that are fitted to each other so as to be movable relative to each other in the axial direction, and a housing 23 connected to a lower end of the lower jacket 22 in the axial direction. The housing 23 houses a speed reduction mechanism 25 that transmits, after deceleration, the power of a steering-assist electric motor 24 to the output shaft 16. The speed reduction mechanism 25 includes a drive gear 26 connected to a rotary shaft (not shown) of the electric motor 24 so as to be rotatable together with the rotary shaft of the electric motor 24, and a driven gear 27 that meshes with the drive gear 26 and rotates together with the output shaft 16. The drive gear 26 is composed of, for example, a worm shaft, while the driven gear 27 is composed of, for example, a worm wheel.

The steering column 20 is fixed to the vehicle-body-side members 18 and 19 via an upper bracket 28 on the vehicle rear side and a lower bracket 29 on the vehicle front side. The upper bracket 28 can be fixed to the upper jacket 21 of the steering column 20 via a later-described column bracket. The upper bracket 28 is fixed to the vehicle-body-side member 18 using a fixed bolt (stud bolt) 30 projecting downward from the vehicle-body-side member 18, a nut 31 screwed to the fixed bolt 30, and a capsule 32 detachably held by the upper bracket 28.

The lower bracket 29 is fixed to the housing 23 of the steering column 20. The lower bracket 29 is fixed to the vehicle-body-side member 19 using a fixed bolt (stud bolt) 33 projecting from the vehicle-body-side member 19, and a nut 34 screwed to the fixed bolt 33. The intermediate shaft 5 as the spline telescopic shaft includes an inner shaft 40 and an outer shaft 50 that is spline-fitted to the inner shaft 40. The inner shaft 40 and the outer shaft 50 can transmit torque therebetween and are slidable relative to each other in an axial direction X1. The outer shaft 50 is connected to the steering shaft 3 (specifically the output shaft 16 of the second steering shaft 12) via the universal joint 4. The inner shaft 40 is connected to the pinion shaft 7 via the universal joint 6.

In this embodiment, the outer shaft 50 constitutes an upper shaft, while the inner shaft 40 constitutes a lower shaft. However, the inner shaft 40 may constitute an upper shaft, while the outer shaft 50 may constitute a lower shaft. In this embodiment, a description will be provided on the case where the spline telescopic shaft manufactured by the manufacturing method of the disclosure is applied to the intermediate shaft 5. However, the spline telescopic shaft may be applied to the first steering shaft 11 so that the first steering shaft 11 performs a telescopic adjustment function and a shock absorbing function. The spline telescopic shaft may be applied to a steering system for manual steering that does not use a steering assist force.

Figure 2:
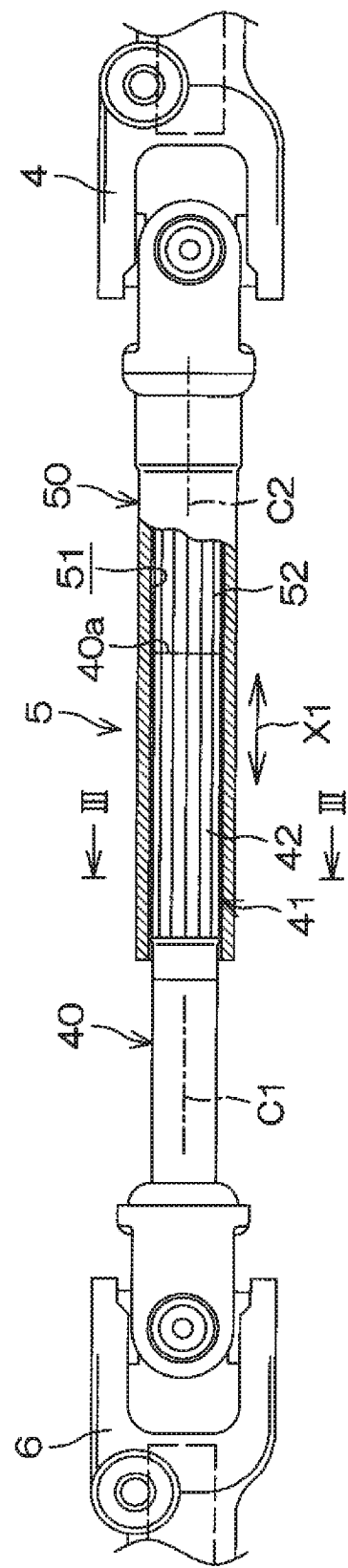
FIG. 2 is a partially broken front view of the intermediate shaft according to the first embodiment.
Figure 3:
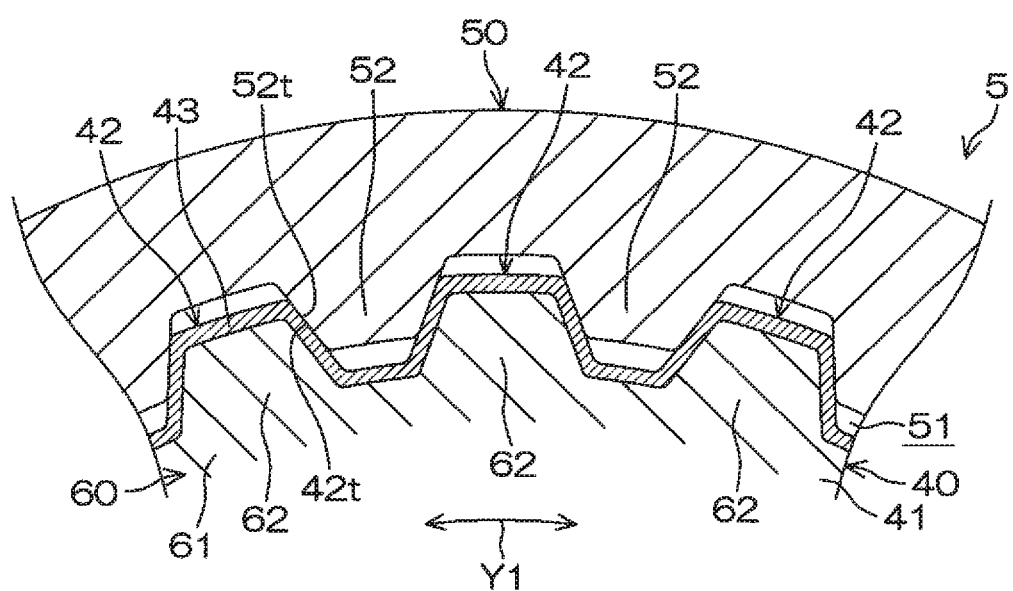
FIG. 3 is an enlarged cross-sectional view taken along line III-III of FIG. 2.
Figure 4A:
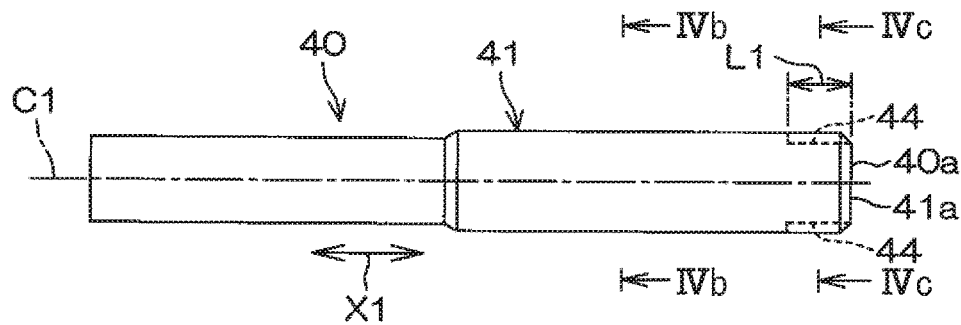
FIG. 4A is a side view of an inner shaft according to the first embodiment.
Figure 4B:
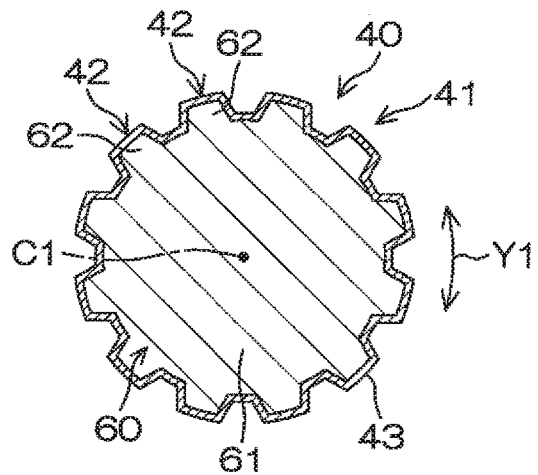
FIG. 4B is a cross-sectional view taken along line IVb-IVb of FIG. 4A.
Figure 4C:
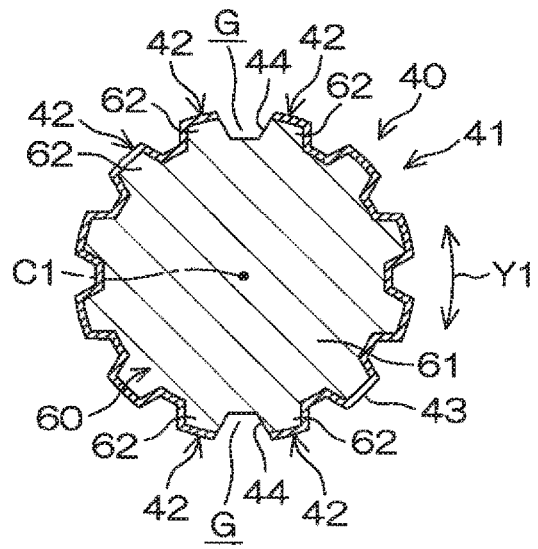
FIG. 4C is a cross-sectional view taken along line IVc-IVc of FIG. 4A.

FIG. 2 is a partially broken front view of the intermediate shaft 5, and FIG. 3 is a cross-sectional view taken along line III-III of FIG. 2. FIG. 4A is a side view of the inner shaft 40 according to the first embodiment, FIG. 4B is a cross-sectional view taken along line IVb-IVb of FIG. 4A, and FIG. 4C is a cross-sectional view taken along line IVc-IVc of FIG. 4A. As shown in FIGS. 2 and 4A, the inner shaft 40 includes a spline shaft portion 41 located in a prescribed length range from its one end 40a in the axial direction X1. As shown in FIG. 2, the outer shaft 50 has a spline hole portion 51 that is spline-fitted to the spline shaft portion 41.

As shown in FIG. 2, the surface of the spline shaft portion 41 is disposed around a central axis C1 of the inner shaft 40. The surface of the spline shaft portion 41 is provided with a male spline 42 as an outer tooth portion, the male spline 42 extending straight in the axial direction X1. As shown in FIG. 4B, the inner shaft 40 includes a metal core 60. The metal core 60 includes a metal spline shaft portion 61 that serves as a core of the spline shaft portion 41. The surface of the spline shaft portion 61 is provided with a male spline 62 as a metal outer tooth portion. The male spline 62 is annularly disposed.

As shown in FIGS. 4B and 4C, the surface of the spline shaft portion 41 is provided with a resin coating film 43 except at metal exposed portions 44 as partial regions where a surface of the metal core 60 is exposed. That is, in an axial-direction region L1 located in a prescribed length range (10 mm or more) in the axial direction X1 from the end 41a of the spline shaft portion 41 in the axial direction X1 as shown in FIG. 4A, the metal exposed portions 44 (corresponding to tooth faces of the male spline 62 of the metal core 60) are disposed at inner surfaces of a plurality of (two in this embodiment) tooth grooves G, equally spaced circumferentially, out of all tooth grooves arranged in a circumferential direction Y1 as shown in FIG. 4C. That is, the metal exposed portions 44 are disposed at two positions equally spaced in the circumferential direction Y1 of the spline shaft portion 41.

The outer shaft 50 is made of metal, and as shown in FIGS. 2 and 3, the inner surface of the spline hole portion 51 of the outer shaft 50 is disposed around a central axis C2 (see FIG. 2) of the outer shaft 50. The inner surface of the spline hole portion 51 is provided with a female spline 52 as an inner tooth portion, the female spline 52 extending straight in the axial direction X1. As shown in FIG. 3, tooth faces 42t formed by the resin coating film 43 of the male spline 42 of the inner shaft 40 mesh with metal tooth faces 52t of the female spline 52 of the outer shaft 50.

In FIG. 4A, the axial-direction region L1 where the metal exposed portions 44 of the spline shaft portion 41 are provided is also used as a sliding region relative to the outer shaft 50. That is, the resin coating film in the axial-direction region L1 (the resin coating film 43 in FIG. 4C) and the female spline 52 of the outer shaft 50 slide relative to each other in the axial direction X1. FIG. 5 including (a) to (g) shows processes of manufacturing the inner shaft 40.

First, by performing forging on a material in a forging process ((a) in FIG. 5), a metal core 60 provided with a spline shaft portion 61 including a male spline 62 is obtained as shown in (b) in FIG. 5. Then, as shown in (c) in FIG. 5, masking members 70 are attached to the metal core 60. Specifically, as shown in FIG. 6A that is a schematic side view of the metal core 60, the masking members 70 are respectively attached to the tooth grooves G at two positions facing each other in a radial direction of the male spline 62 of the metal core 60.

Figure 6A:
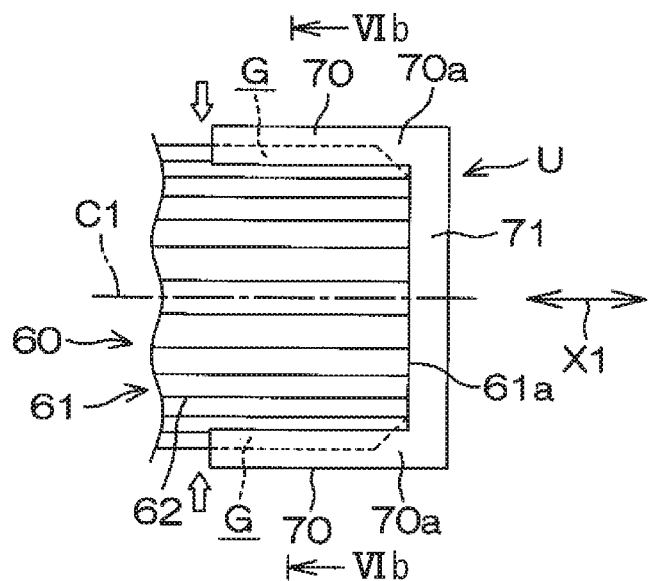
FIG. 6A is a schematic side view of a main part of a metal core to which masking members are attached in the first embodiment.
Figure 6B:
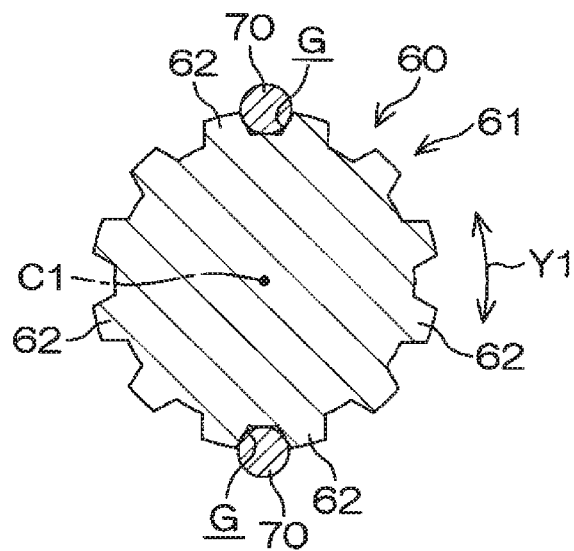
FIG. 6B is a cross-sectional view taken along line VIb-VIb of FIG. 6A.

As shown in FIG. 6B that is a cross-sectional view taken along line VIb-VIb of FIG. 6A, each masking member 70 has a circular cross-sectional shape. Alternatively, each masking member 70 may be a bar having a trapezoidal cross-sectional shape or another polygonal cross-sectional shape. Ends 70a of the masking members 70 are connected to each other by a linear connecting member 71. Accordingly, an integral unit U including the plurality of masking members 70 and the connecting member 71 is formed. Consequently, the masking members 70 can be collectively attached to the metal core 60. Thus, the masking members 70 can be attached to the metal core with high working efficiency. The connecting member 71 may be omitted.

Figure 6C:
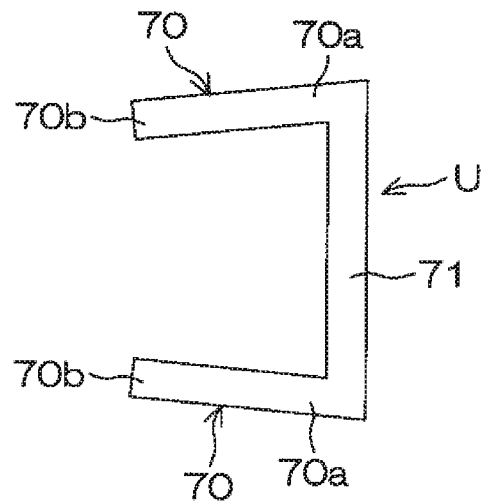
FIG. 6C is a side view of a unit including the masking members.

FIG. 6C is a side view of the unit U in a free state. As shown in FIG. 6C, the connecting member 71 supports the ends 70a of both masking members 70 in a cantilever manner. In the unit U in the free state, the interval between the other ends 70b of both masking members 70 is smaller than the interval between the ends 70a of both masking members 70. Therefore, when the unit U is attached to the metal core 60 in a state where the interval between the other ends 70b of both masking members 70 is expanded as shown in FIG. 6A, the connecting member 71 has a spring property to elastically urge both masking members 70 to pivot about the ends 70a serving as fulcrums such that the other ends 70b are moved closer to each other. That is, each masking member 70 is elastically pressed against the corresponding tooth groove G by the spring property of the connecting member 71 while being supported in the cantilever manner by the connecting member 71. Therefore, the holding force of each masking member 70 relative to the corresponding tooth groove G can be made high.

The connecting member 71 is brought into contact with an end face 61a, in the axial direction X1, of the spline shaft portion 61 of the metal core 60 (corresponding to an end face of the metal core 60 in the axial direction X1) such that the connecting member 71 is positioned in the axial direction X1. Therefore, the masking members 70 are accurately positioned in the axial direction X1. Then, a resin coating process (see (d) in FIG. 5) is carried out. In the resin coating process, a fluidized immersion method, for example, is used. That is, after pretreatment (e.g. primer treatment) is applied to the metal core 60 to which the masking members 70 have been attached, the metal core 60 is heated and then the heated metal core 60 is immersed for a prescribed time in a fluidized immersion bath in which resin powder is fluidized.

Consequently, the resin powder is adhered to the metal core 60 and melted by the heat. Thus, as shown in (e) in FIG. 5, there is obtained an intermediate manufacturing product 40A including a spline shaft portion 41A with a male spline 42A whose surface is formed by a resin layer 43A. That is, the surface of the male spline 62 of the metal core 60 is covered with the resin layer 43A such that the male spline 42A is obtained. In the male spline 42A, inner surfaces of partial tooth grooves G covered by the masking members 70 are left as a plurality of metal exposed portions 44 that are disposed to be equally spaced circumferentially.

Then, as shown in (f) and (g) in FIG. 5, a resin coating film forming process is carried out. In the resin coating film forming process, the intermediate manufacturing product 40A provided with the resin layer 43A is centered with respect to an annular surface broach 80 (also referred to as a die) via the plurality of metal exposed portions 44. Specifically, as shown in (f) in FIG. 5, a central axis C1 of the intermediate manufacturing product 40A is centered with respect to a central axis C3 of the surface broach 80 by a centering member 90, such as a ball plunger, which elastically pushes the circumferentially equally spaced metal exposed portions 44 toward a radially inner side of the intermediate manufacturing product 40A.

More specifically, a circular hole 45 centered on the central axis C1 is formed in an end face of the intermediate manufacturing product 40A (an end face of the metal core provided with no resin layer), and a conical projecting portion 101 of a holding jig 100 is inserted into the circular hole 45. Consequently, the holding jig 100 and the centering member 90 cooperate to achieve centering between the central axis C1 of the intermediate manufacturing product 40A and the central axis C3 of the surface broach 80. The above-described centering method is only an example and the centering method is not limited to the above-described centering method.

The intermediate manufacturing product 40A and the surface broach 80 in this centered state are caused to slide relative to each other in the axial direction X1. Specifically, as shown in (g) in FIG. 5, the holding jig 100 is pressed toward the surface broach 80 by a pressing member (not shown), thereby press-fitting the intermediate manufacturing product 40A into a processing hole 81 of the surface broach 80. While press-fitting the intermediate manufacturing product 40A, the centering member 90 may be elastically retreated to a radially outer side of the intermediate manufacturing product 40A when it rides on the resin layer 43A, or the centering member 90 may be retreated to a position at which the centering member 90 does not interfere with the resin layer 43A immediately after the metal exposed portions 44 pass the centering member 90. In such a case as well, the accuracy of the thickness of a resin coating film that is formed can be made high. The reason for this is that the accuracy of the thickness of a resin coating film that is formed is substantially determined by the centering in the initial stage of press-fitting (the start of engagement) of the intermediate manufacturing product 40A into the processing hole 81 of the surface broach 80 and that, in the press-fitting initial stage, the fall of the intermediate manufacturing product 40A is prevented by the centering member 90 that contacts the metal exposed portions 44 that are arranged at two positions equally spaced circumferentially.

Excess portions 43AK of the resin layer 43A are shaved (trimmed) during the press-fitting of the intermediate manufacturing product 40A, so that there is obtained an inner shaft 40 having a uniform resin coating film 43 (see FIGS. 4B and 4C). Then, although not shown, the inner shaft 40 is removed from the surface broach 80, and grease is applied to a surface of the resin coating film 43 of the inner shaft 40. Then, the inner shaft 40, to which the grease has been applied, is fitted into an outer shaft 50, so that an intermediate shaft 5 as a spline telescopic shaft is completed.

According to the manufacturing method of this embodiment, in the resin coating film forming process, the intermediate manufacturing product 40A can be accurately centered with respect to the surface broach 80 using the circumferentially equally spaced metal exposed portions 44 formed in the resin coating process. Therefore, the uniform resin coating film 43 can be formed in the resin coating film forming process. Accordingly, it is possible to ensure smooth sliding of the intermediate shaft 5 as the spline telescopic shaft, over a long period of time.

Further, since the resin coating film 43 disposed at the same axial-direction position as the axial-direction position where the metal exposed portions 44 are disposed (the resin coating film 43 in FIG. 4C) can also be used as a sliding region, it is possible to ensure the sufficient telescopic stroke of the intermediate shaft 5. Further, since it is possible to ensure the fitting area of the entire fitting portions of the intermediate shaft 5, it is possible to reduce the contact surface pressure of the fitting portions and thus to improve the durability.

Figure 7:
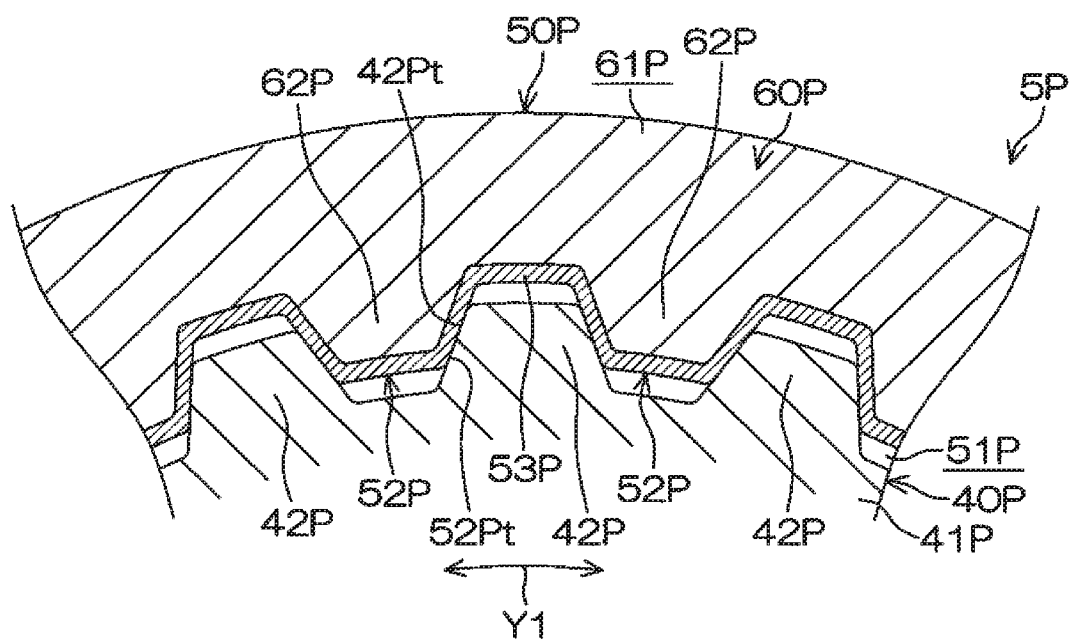
FIG. 7 is an enlarged view of an axis-perpendicular cross section of a main part of an intermediate shaft as a spline telescopic shaft manufactured by a manufacturing method of a second embodiment of the disclosure.
Figure 8A:
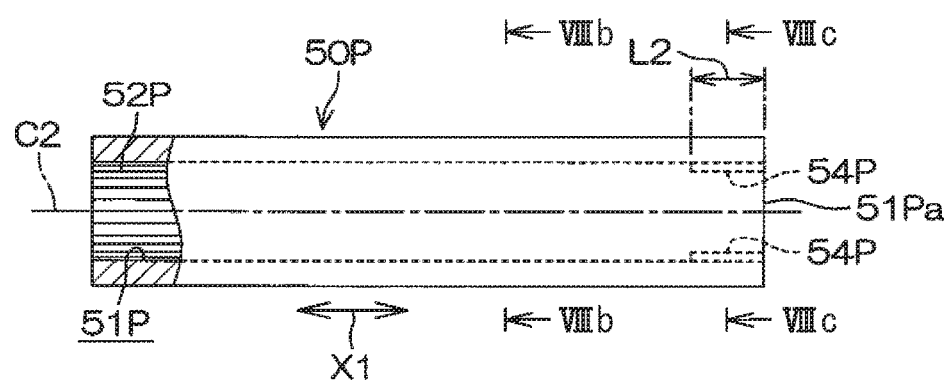
FIG. 8A is a side view of an outer shaft according to the second embodiment.

FIG. 7 is an enlarged view of an axis-perpendicular cross section of a main part of an intermediate shaft 5P as a spline telescopic shaft manufactured by a manufacturing method of a second embodiment of the disclosure. FIG. 8A is a side view of an outer shaft according to the second embodiment, FIG. 8B is a cross-sectional view taken along line VIIIb-VIIIb of FIG. 8A, and FIG. 8C is a cross-sectional view taken along line VIIIc-VIIIc of FIG. 8A.

As shown in FIG. 7, the intermediate shaft 5P as the spline telescopic shaft includes an inner shaft 40P and an outer shaft 50P that is spline-fitted to the inner shaft 40P. The inner shaft 40P and the outer shaft 50P can transmit torque therebetween and are slidable relative to each other in an axial direction (a direction perpendicular to the sheet surface in FIG. 7). The inner shaft 40P is made of metal. The outer surface of a spline shaft portion 41P of the inner shaft 40P is provided with a male spline 42P as an outer tooth portion extending straight in the axial direction.

The outer shaft 50P has a spline hole portion 51P that is spline-fitted to the spline shaft portion 41P of the inner shaft 40P. The male spline 42P as the outer tooth portion at the surface of the spline shaft portion 41P and a female spline 52P as an inner tooth portion at an inner surface of the spline hole portion 51P are fitted to each other. Tooth faces 53Pt formed by a resin coating film 53P of the female spline 52P of the outer shaft 50P mesh with tooth faces 42Pt of the male spline 42P of the inner shaft 40P, the tooth faces 42Pt being made of metal.

Figure 8B:
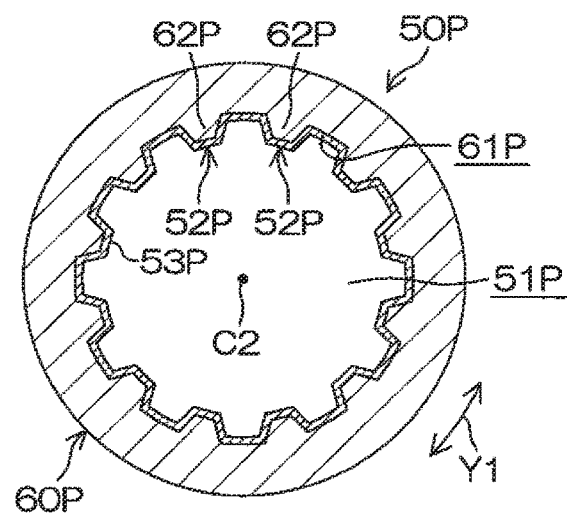
FIG. 8B is a cross-sectional view taken along line VIIIb-VIIIb of FIG. 8A.
Figure 8C:
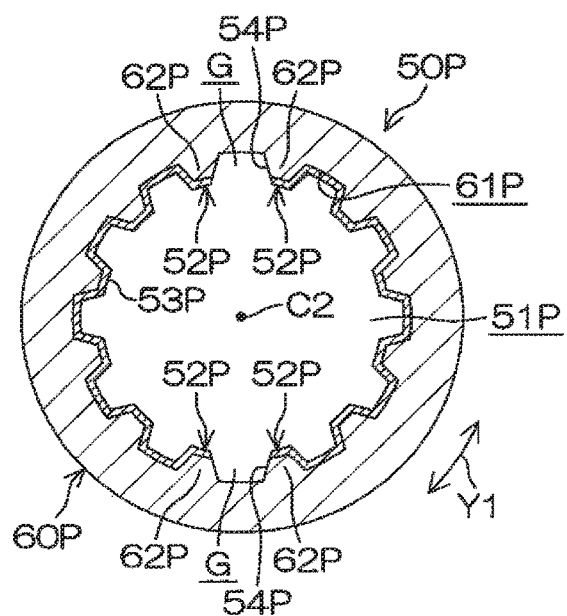
FIG. 8C is a cross-sectional view taken along line VIIIc-VIIIc of FIG. 8A.

As shown in FIG. 8B, the outer shaft 50P includes a metal tube 60P. The metal tube 60P has a spline hole portion 61P extending through the metal tube 60P in the axial direction. The inner surface of the spline hole portion 61P is provided with a metal female spline 62P. The metal female spline 62P is annularly disposed. As shown in FIGS. 8B and 8C, the surface of the spline hole portion 51P is provided with the resin coating film 53P except at metal exposed portions 54P as partial regions where an inner surface of the metal tube 60P is exposed.

That is, in an axial-direction region L2 located in a prescribed length range (10 mm ore more) in an axial direction X1 from an end 51Pa of the spline hole portion 51P in the axial direction X1 as shown in FIG. 8A, the metal exposed portions 54P (corresponding to tooth faces of the female spline 62P of the metal tube 60P) are disposed at inner surfaces of a plurality of (two in this embodiment) tooth grooves G, equally spaced circumferentially, out of all tooth grooves arranged in a circumferential direction Y1 as shown in FIG. 8C. That is, the metal exposed portions 54P are arranged at two positions equally spaced circumferentially in the circumferential direction Y1 of the spline hole portion 51P.

Figure 9:
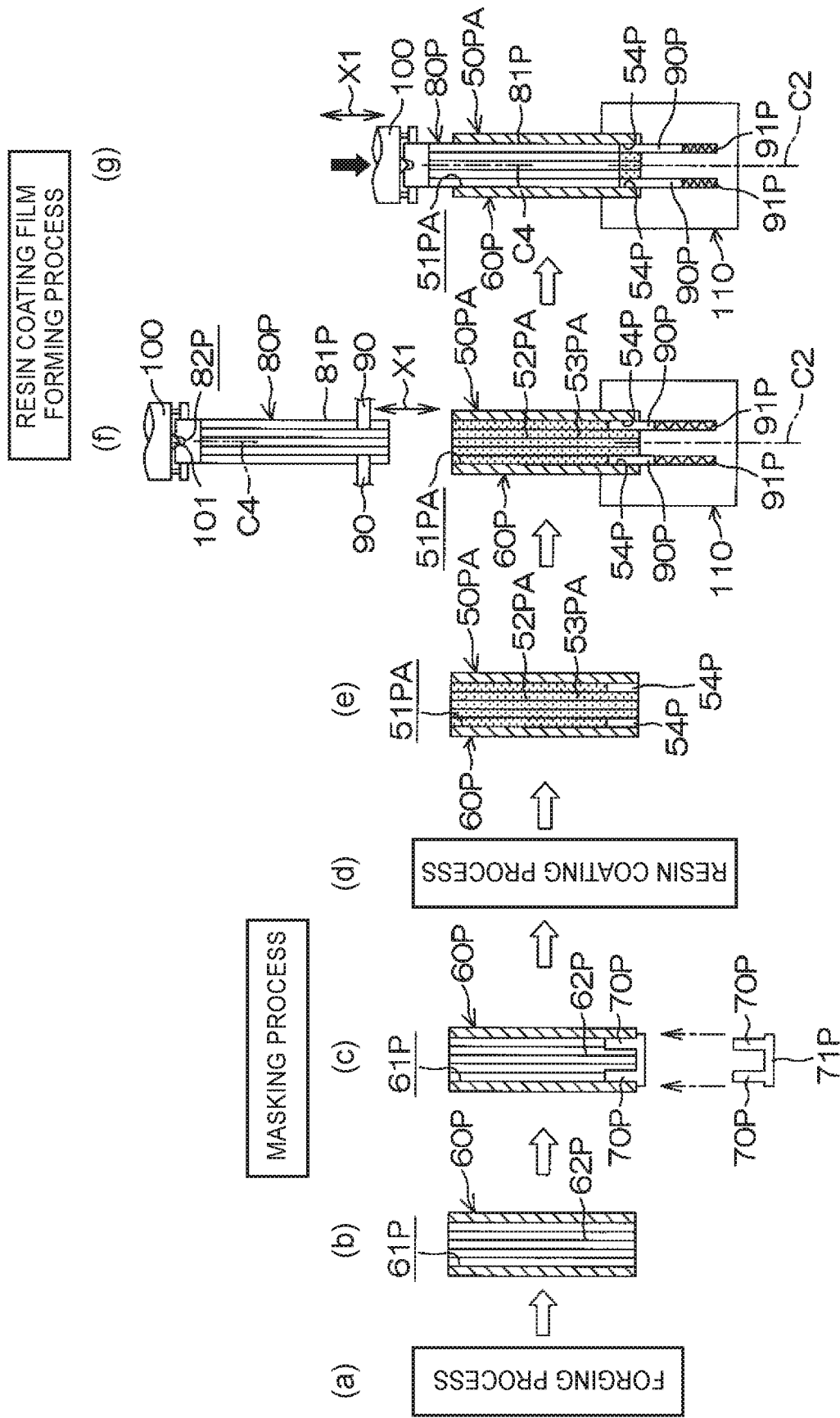
FIG. 9 including (a) to (g) is a schematic diagram showing processes of manufacturing the outer shaft in the second embodiment.

In FIG. 8A, the axial-direction region L2 where the metal exposed portions 54P of the spline hole portion 51P are provided is also used as a sliding region relative to the inner shaft 40P. That is, the resin coating film in the axial-direction region L2 (the resin coating film 53P in FIG. 8C) and the male spline 42P of the inner shaft 40P slide relative to each other in the axial direction X1. FIG. 9 including (a) to (g) shows processes of manufacturing the outer shaft 50P.

Figure 10A:
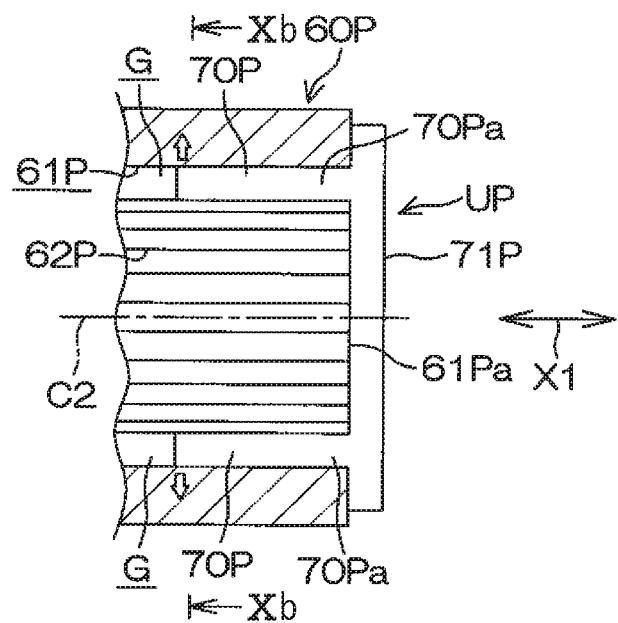
FIG. 10A is a schematic side view of a main part of a metal tube to which masking members are attached in the second embodiment.
Figure 10B:
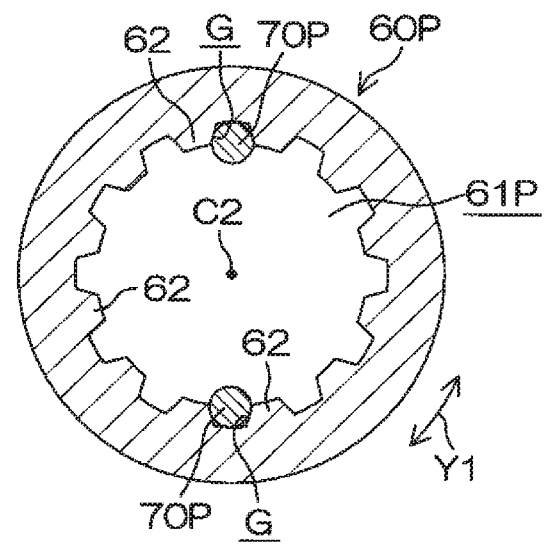
FIG. 10B is a cross-sectional view taken along line Xb-Xb of FIG. 10A.

First, by performing forging on a material in a forging process ((a) in FIG. 9), a metal tube 60P provided with a spline hole portion 61P having a female spline 62P is obtained as shown in (b) in FIG. 9. Then, as shown in (c) in FIG. 9, masking members 70P are attached to the metal tube 60P. Specifically, as shown in FIGS. 10A and 10B that are schematic sectional views of the metal tube 60P, the masking members 70P are inserted in the axial direction X1 and respectively attached to the tooth grooves G at two positions facing each other in a radial direction of the female spline 62P of the metal tube 60P. Ends 70Pa of both masking members 70P are connected to each other by a linear connecting member 71P, so that an integral unit UP is formed.

Figure 10C:
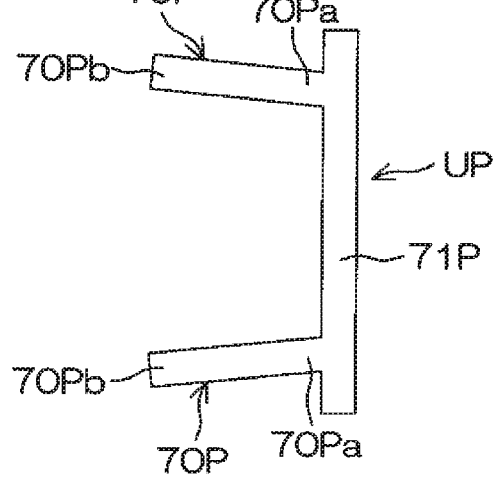
FIG. 10C is a side view of a unit including the masking members.

FIG. 10C is a side view of the unit UP in a free state. As shown in FIG. 10C, the connecting member 71P supports the ends 70Pa of both masking members 70P in a cantilever manner. In the unit UP in the free state, the interval between the other ends 70Pb of both masking members 70P is greater than the interval between the ends 70Pa of both masking members 70P. Therefore, when the unit UP is attached to the metal tube 60P in a state where the interval between the other ends 70Pb of both masking members 70 is shortened as shown in FIG. 10A, the connecting member 71P has a spring property to elastically urge both masking members 70P to pivot about the ends 70Pa serving as fulcrums such that the other ends 70Pb are moved away from each other. That is, each masking member 70P is elastically pressed against the corresponding tooth groove G by the spring property of the connecting member 71P while being supported in the cantilever manner by the connecting member 71P. Therefore, the holding force of each masking member 70P relative to the corresponding tooth groove G can be made high.

The connecting member 71P is brought into contact with an end face 61Pa, in the axial direction X1, of the spline hole portion 61P of the metal tube 60P (corresponding to an end face of the metal tube 60P in the axial direction X1) such that the connecting member 71P is positioned in the axial direction X1. Therefore, the masking members 70P are accurately positioned in the axial direction X1. Then, a resin coating process (see (d) in FIG. 9) is carried out. In the resin coating process, a fluidized immersion method, for example, is used. That is, after pretreatment (e.g. primer treatment) is applied to the metal tube 60P to which the masking members 70P have been attached, the metal tube 60P is heated and then the heated metal tube 60P is immersed for a prescribed time in a fluidized immersion bath in which resin powder is fluidized.

Consequently, the resin powder is adhered to the metal tube 60P and melted by the heat. Thus, as shown in (e) in FIG. 9, there is obtained an intermediate manufacturing product 50PA having a spline hole portion 51PA with a female spline 52PA whose surface is formed by a resin layer 53PA. That is, the surface of the female spline 62P of the metal tube 60P is covered with the resin layer 53PA such that the female spline 52PA is obtained. In the female spline 52PA, inner surfaces of the partial tooth grooves G covered by the masking members 70P are left as a plurality of metal exposed portions 54P that are disposed to be equally spaced circumferentially.

Then, as shown in (f) and (g) in FIG. 9, a resin coating film forming process is carried out. In the resin coating film forming process, the intermediate manufacturing product 50PA provided with the resin layer 53PA is centered with respect to an annular inner surface broach 80P via the plurality of metal exposed portions 54P. Specifically, as shown in (f) in FIG. 9, a centering member 90P and a centering member 90 (corresponding to the centering member 90 in (f) in FIG. 5 in the first embodiment) are used. The centering member 90P is supported by a holding jig 110 so as to be movable in the axial direction X1 and is elastically urged in the axial direction X1 by an urging member 91P. The centering member 90 engages with a distal end portion of the inner surface broach 80P having a metal surface.

The centering member 90P is engaged with the circumferentially equally spaced metal exposed portions 54P of the intermediate manufacturing product 50PA, while the centering member 90 elastically pushes radially inwardly a plurality of tooth grooves formed on the distal end portion of the inner surface broach 80P. Thus, a central axis C2 of the intermediate manufacturing product 50PA is centered with respect to a central axis C4 of the inner surface broach 80P. More specifically, a circular hole 82P centered on the central axis C4 is formed in an end face of the inner surface broach 80P including a processing shaft 81P, and a conical projecting portion 101 of a holding jig 100 is inserted into the circular hole 82P. Consequently, the holding jig 100, the centering member 90, and the centering member 90P cooperate to achieve centering between the central axis C2 of the intermediate manufacturing product 50PA and the central axis C4 of the inner surface broach 80P. The above-described centering method is only an example, and the centering method is not limited to the above-described centering method.

The intermediate manufacturing product 50PA and the inner surface broach 80P in this centered state are caused to slide relative to each other in the axial direction X1. Specifically, as shown in (g) in FIG. 9, the holding jig 100 is pressed toward the intermediate manufacturing product 50PA by a pressing member (not shown), thereby press-fitting the inner surface broach 80P into the spline hole portion 51PA of the intermediate manufacturing product 50PA. While press-fitting the inner surface broach 80P, the centering member 90P contacts an end face of the processing shaft 81P of the inner surface broach 80P and is elastically retreated toward an axially outer side of the intermediate manufacturing product 50PA.

Excess portions of the resin layer 53PA are shaved (trimmed) during the press-fitting of the inner surface broach 80P, so that there is obtained an outer shaft 50P having a resin coating film 53P with a uniform thickness (see FIGS. 8B and 8C). Then, although not shown, grease is applied to a surface of the resin coating film 53P of the outer shaft 50P removed from the inner surface broach 80P. Then, the outer shaft 50P, to which the grease has been applied, is fitted to an inner shaft 40P, and thus, an intermediate shaft 5P as a spline telescopic shaft is completed.

According to the manufacturing method of this embodiment, in the resin coating film forming process, the intermediate manufacturing product 50PA can be accurately centered with respect to the inner surface broach 80P using the circumferentially equally spaced metal exposed portions 54P formed in the resin coating process. Therefore, the uniform resin coating film 53P can be formed in the resin coating film forming process. Accordingly, it is possible to ensure smooth sliding of the intermediate shaft 5P as the spline telescopic shaft over a long period of time.

Further, since the resin coating film 53P disposed at the same axial-direction position as the axial-direction position where the metal exposed portions 54P are disposed (the resin coating film 53P in FIG. 8C) can also be used as a sliding region, it is possible to ensure the sufficient telescopic stroke of the intermediate shaft 5P. Further, since it is possible to ensure the fitting area of the entire fitting portions of the intermediate shaft 5P, it is possible to reduce the contact surface pressure of the fitting portions and thus to improve the durability.

Figure 11A:
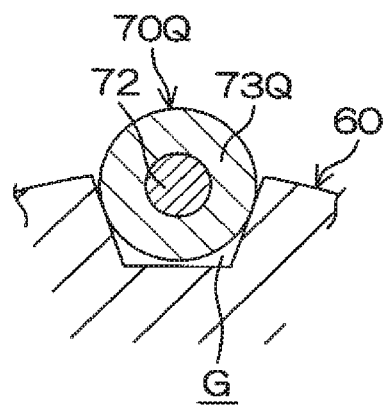
FIGS. 11A and 11B are schematic cross-sectional views of metal cores in masking processes according to third and fourth embodiments of the disclosure, respectively.
Figure 11B:
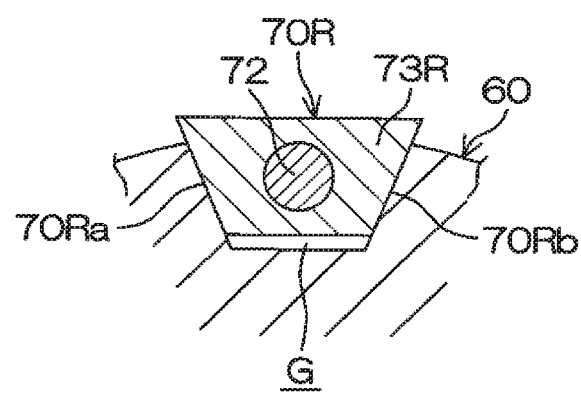

FIGS. 11A and 11B are cross-sectional views of masking members that are respectively used in masking processes according to third and fourth embodiments of the disclosure.

A masking member 70Q in FIG. 11A is a shaft member including a permanent magnet 72 which is, for example, bar-shaped, and a cover member 73Q in which the permanent magnet 72 is embedded at its center. The masking member 70Q is formed to have a circular cross-sectional shape. A masking member 70R in FIG. 11B is a shaft member including a permanent magnet 72 and a cover member 73R in which the permanent magnet 72 is embedded at its center. The masking member 70R is formed to have a trapezoidal cross-sectional shape. The inclinations of a pair of leg portions 70Ra and 70Rb of the trapezoidal shape of the masking member 70R match the inclinations of a pair of tooth faces defining a tooth groove G.

A material having heat resistance and magnetism is used as the cover member 73Q, 73R. For example, a heat-resistant rubber or a heat-resistant resin containing carbon as a magnetic body is used. In the third and fourth embodiments, the masking member 70Q, 70R can be easily detachably attached to, and held at the tooth groove G by magnetic attractive force in the masking process. Although not shown, a masking member including an electromagnet may be used, and the masking member may be attached and detached by energizing and de-energizing the electromagnet. Alternatively, a masking member may be formed only by a permanent magnet.

Figure 12A:
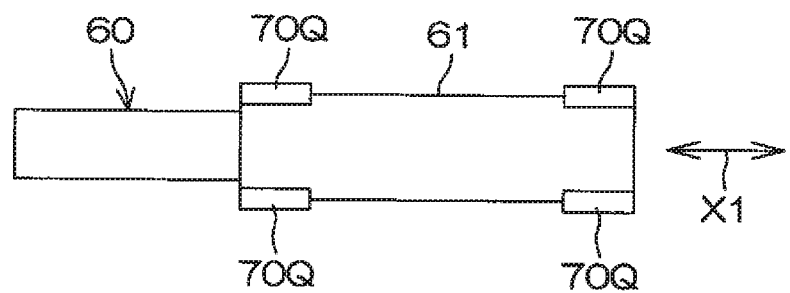
FIG. 12A is a schematic side view of a metal core in a masking process according to a fifth embodiment of the disclosure.

FIG. 12A is a schematic sectional view of a metal core in a masking process according to a fifth embodiment of the disclosure. As shown in FIG. 12A, in the masking process, masking members (e.g. 70Q) may be attached to a spline shaft portion 61 of a metal core 60 at two positions spaced apart from each other in an axial direction X1 (e.g. axial-direction regions at both ends or axial-direction regions near both ends).

Figure 12B:
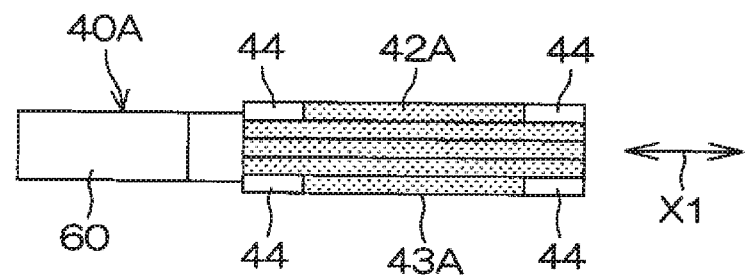
FIG. 12B is a schematic side view of an intermediate manufacturing product obtained through a resin coating process.

In this case, through a resin coating process, it is possible to obtain an intermediate manufacturing product 40A provided with metal exposed portions 44 at two positions in the axial direction X1 as shown in FIG. 12B. Therefore, in a resin coating film forming process (not shown), centering can be performed via the metal exposed portions 44 at the two positions in the axial direction X1, and thus, the centering accuracy is improved.

Figure 13A:
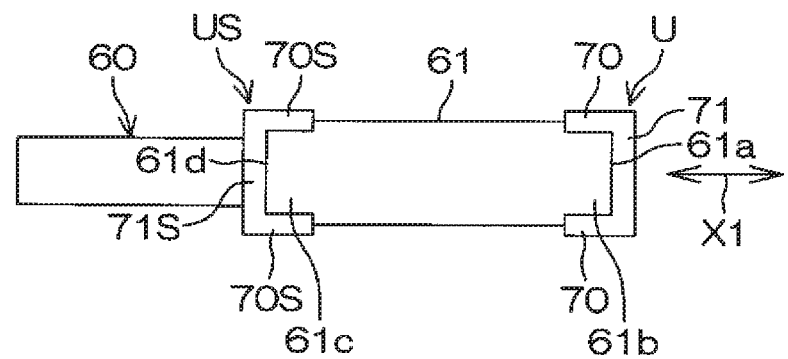
FIG. 13A is a schematic side view of a metal core in a masking process according to a sixth embodiment of the disclosure.

FIG. 13A is a schematic sectional view of a metal core in a masking process according to a sixth embodiment of the disclosure. As shown in FIG. 13A, in the masking process, the unit U including the masking members 70 according to the first embodiment shown in FIGS. 6A to 6C is attached to a distal end portion 61b, in an axial direction X1, of a spline shaft portion 61 of a metal core 60, while a unit US including masking members 70S according to the sixth embodiment is attached to a base end portion 61c of the spline shaft portion 61 in the axial direction X1.

Figure 13B:
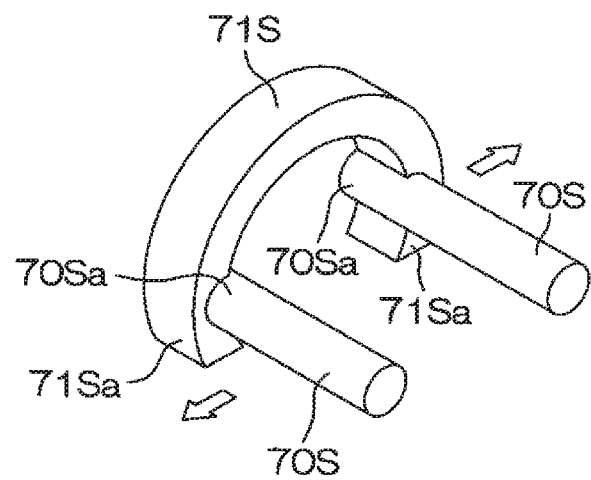
FIG. 13B is a perspective view of a unit including masking members, the unit being used in the masking process.

As shown in FIG. 13B, the unit US is an integral unit including the plurality of masking members 70S and a C-shaped connecting member 71S connecting ends 70Sa of the masking members 70S to each other. As shown in FIG. 13A, the connecting member 71S is brought into contact with a stepped end face 61d of the base end portion 61c of the metal core 60, and thus, the masking members 70S are accurately positioned in the axial direction X1.

As shown by outlined arrows in FIG. 13B, the C-shaped connecting member 71S is elastically deformable so as to expand the interval between a pair of circumferential ends 71Sa. Therefore, it is possible to attach, in a radial direction, the masking members 70S to the base end portion 61c of the spline shaft portion 61.

Figure 14:
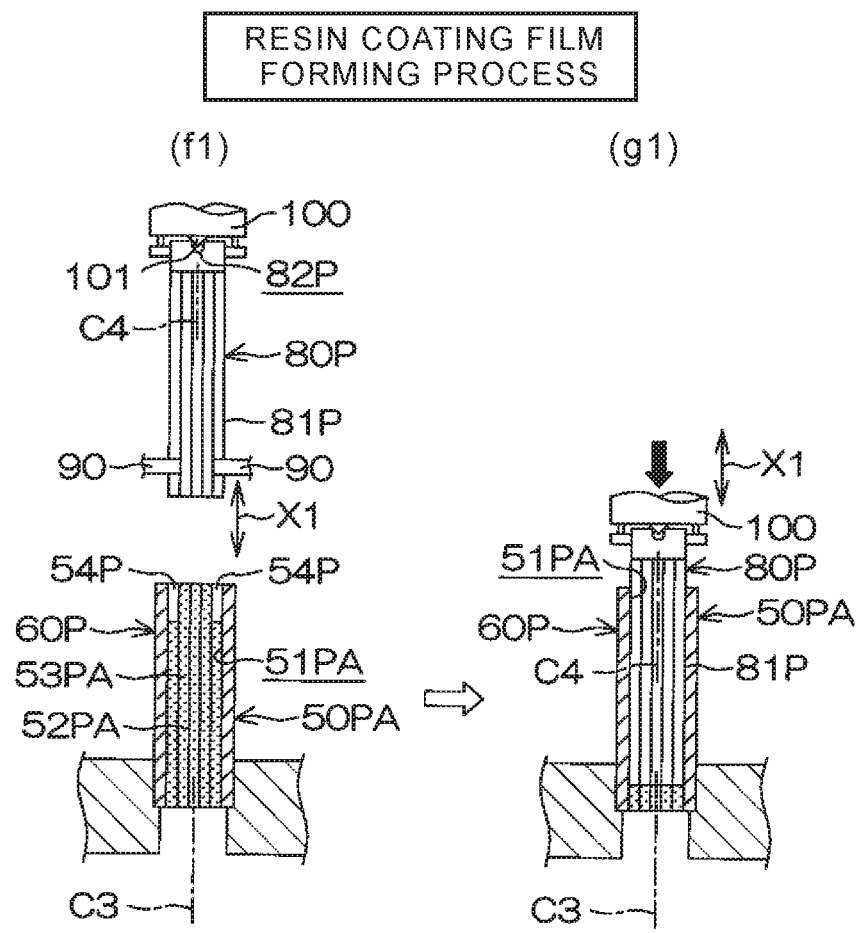
FIG. 14 including (f1) and (g1) is a schematic diagram showing a resin coating film forming process of a seventh embodiment as a modification of the resin coating film forming process of the second embodiment shown in (f) and (g) in FIG. 9.

FIG. 14 including (f1) and (g1) is a schematic diagram showing a resin coating film forming process of a seventh embodiment as a modification of the resin coating film forming process of the second embodiment shown in (f) and (g) in FIG. 9.

The resin coating film forming process of this embodiment shown in (f1) and (g1) in FIG. 14 mainly differs from the resin coating film forming process of the second embodiment shown in (f) and (g) in FIG. 9 in the following. As shown in (f1) in FIG. 14, an intermediate manufacturing product 50PA of an outer shaft is disposed such that its end portion provided with metal exposed portions 54P is located on the inner surface broach 80P-side. A central axis C4 of the inner surface broach 80P is temporarily centered with respect to a central axis C3 of the intermediate manufacturing product 50PA by a centering member 90, such as a ball plunger, which pushes the outer periphery of a distal end portion of the inner surface broach 80P toward a radially inner side of the inner surface broach 80P.

In the press-fitting initial stage in which the distal end portion of the inner surface broach 80P thus temporarily centered is press-fitted into the entrance of a spline hole portion 61P of the intermediate manufacturing product 50PA, the inner surface broach 80P and the intermediate manufacturing product 50PA are accurately centered with each other by the function of the metal exposed portions 54P disposed at the entrance of the spline hole portion 61P. At this time, the centering member 90 may be away from the inner surface broach 80P or may be elastically displaced in accordance with the centering with the use of the metal exposed portions 54P.

Then, as shown in (g1) in FIG. 14, by press-fitting the inner surface broach 80P to the deep side of the spline hole portion 61P of the intermediate manufacturing product 50PA, it is possible to form, with high accuracy, a resin coating film in the spline hole portion 61P. The disclosure is not limited to the embodiments described above. For example, although not shown, the masking members may be disposed at three to five positions in the circumferential direction of the metal core 60 or the metal tube 60P. Each masking member may have a polygonal cross-sectional shape.

The position, at which the metal core 60 or the metal tube 60P is masked by the masking member, may be a position other than the distal end portion of the metal core 60 or the metal tube 60P. In addition, various changes may be made to the above-described embodiments within the scope of the disclosure.

What is claimed is:

1. A method of manufacturing a spline telescopic shaft, comprising:
    a masking step in which, in a prescribed axial-direction region of an intermediate manufacturing product formed by either one of a metal core including a metal outer tooth portion that is annularly disposed and a metal tube including a metal inner tooth portion that is annularly disposed, partial tooth grooves disposed to be equally spaced circumferentially are respectively covered by a plurality of masking members disposed to be equally spaced circumferentially;
    a resin coating step in which a resin layer is formed by supplying a synthetic resin to a surface of the metal outer tooth portion or the metal inner tooth portion, and inner surfaces of the partial tooth grooves covered by the plurality of masking members are left as a plurality of metal exposed portions disposed to be equally spaced circumferentially such that there is a cross-sectional area perpendicular to an axis of rotation in which the plurality of metal exposed portions are each separated by at least one of the partial tooth grooves that are covered by the synthetic resin;
    a centering step, in which centering between a central axis of the intermediate manufacturing product and a central axis of a broach is achieved, utilizing a centering member that pushes the plurality of metal exposed portions toward a radially inner side of the intermediate manufacturing product; and
    a coating film forming step in which, in a state where the intermediate manufacturing product provided with the resin layer is centered with respect to the broach via the plurality of metal exposed portions, the intermediate manufacturing product and the broach are caused to slide relative to each other in an axial direction by press-fitting such that the resin layer is shaved to form a resin coating film.

2. The method according to claim 1, wherein in the masking step, a connecting member connecting ends of the plurality of masking members to each other is brought into contact with an end face of the intermediate manufacturing product in the axial direction.

3. The method according to claim 2, wherein in the masking step, each of the masking members is elastically pressed against a corresponding one of the partial tooth grooves by a spring property of the connecting member while being supported in a cantilever manner by the connecting member.

4. The method according to claim 2, wherein the connecting member is a C-shaped connecting member that is elastically deformable.

5. The method according to claim 1, wherein in the masking step, each of the masking members is held at a corresponding one of the partial tooth grooves by magnetic attractive force.

6. The method according to claim 5, wherein each of the masking members includes a permanent magnet and a cover member in which the permanent magnet is embedded.

* * * * *